R. E. REED.
VARIABLE RESISTANCE DEVICE.
APPLICATION FILED NOV. 13, 1916.
1,225,357.
Patented May 8, 1917.
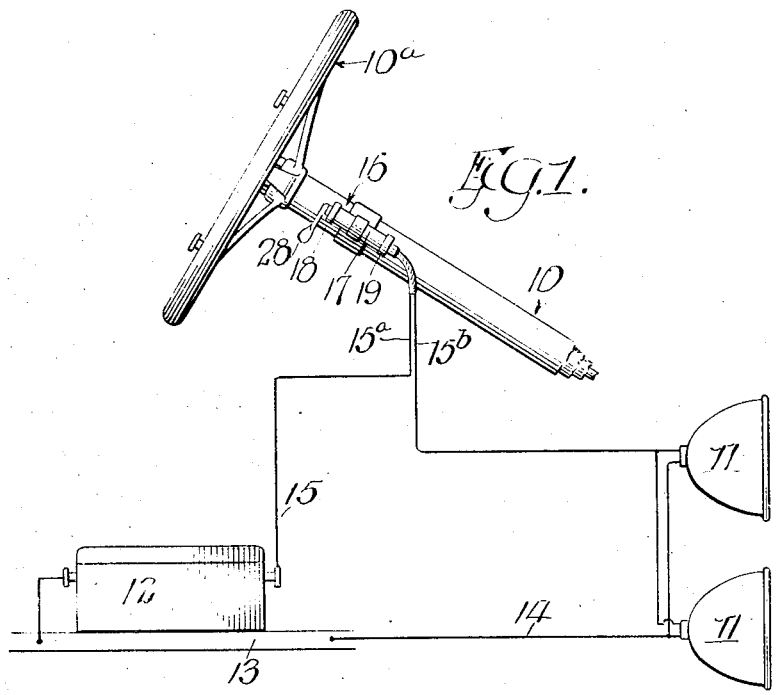
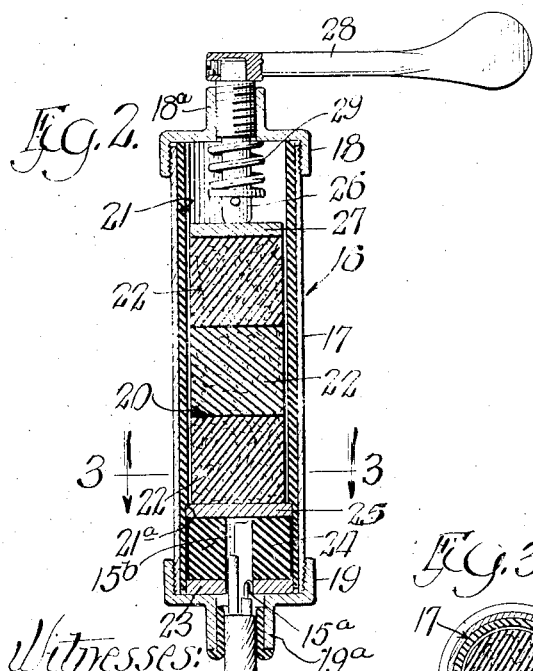
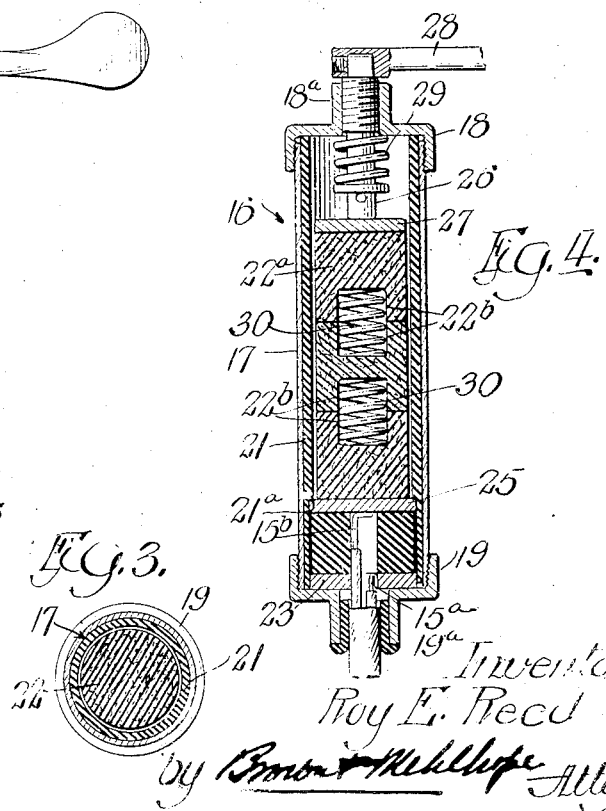
Witnesses:
T. H. Alfred
R. A. Raymond
Inventor
Roy E. Reed
by Brown & McKellipe Attys

UNITED STATES PATENT OFFICE.

ROY E. REED, OF RIPON, WISCONSIN.

VARIABLE-RESISTANCE DEVICE.

1,225,357.      Specification of Letters Patent.      Patented May 8, 1917.

Application filed November 13, 1916. Serial No. 131,001.

*To all whom it may concern:*

Be it known that I, ROY E. REED, a citizen of the United States, and a resident of Ripon, in the county of Fond du Lac and State of Wisconsin, have invented certain new and useful Improvements in Variable-Resistance Devices; and I do hereby declare that the following is a full, clear, and exact description thereof, reference being had to the accompanying drawings, and to the letters of reference marked thereon, which form a part of this specification.

This invention relates to improvements in variable resistance devices adapted to be interposed in circuit with a translating device for controlling the electric current supplied to said translating device, and consists of the matters hereinafter described and more particularly pointed out in the appended claims.

The object of the invention is to produce a variable resistance device of the kind described, which is simple in construction and efficient in operation and result.

The device is designed primarily for use in connection with currents of comparatively low voltage, as for example, as a dimming device for regulating electric lights, such as head-lights and other lights, of motor vehicles, but manifestly may be used for other purposes.

The advantages of my improvement will appear as I proceed with my specification.

In the drawings:

Figure 1 is a view representing my improved variable resistance device applied for the purpose of dimming the lights of an automobile or other motor vehicle,—said view representing the steering post and steering wheel of an automobile in side elevation with the variable resistance device attached to the steering post and representing the electric circuits, the battery and the lamps diagrammatically.

Fig. 2 is a view representing on an enlarged scale, a longitudinal, central section through the variable resistance device.

Fig. 3 is a view representing a transverse section through Fig. 2, in a line indicated by the line 3—3 of Fig. 2.

Fig. 4 is a view representing a section similar to that of Fig. 2, but with parts of the device modified in a manner to be referred to later.

Referring now to the embodiment of the invention shown in the drawings, and especially in Figs. 1 to 3 thereof:—10 indicates the steering post of a motor vehicle; 11 indicates a translating device which as illustrated herein is the head-lights or other lights of the said motor vehicle; 12 indicates the source of current for supplying said lamps,—in this case, a battery; 13 indicates the frame of the vehicle; and 14, 15 indicate the line wires of the electric circuit.

In one branch of the electric circuit is interposed the variable resistance device 16 which forms the subject matter of the invention and which is shown herein used as a dimming device for the lamps 11. The device is preferably attached to the steering post 10 near the steering wheel $10^a$ and is inclosed in a casing comprising a tubular barrel 17 having top and bottom end caps 18, 19 respectively.

20 indicates a combination resistance-conductance member located in the casing and 21 indicates an insulation tube or lining placed within the barrel 17 and surrounding the said member 20. The resistance-conductance member is made up of a plurality of separate conducting blocks or plates 22 arranged in a stack. Said blocks are of comparatively large cross-sectional area in proportion to the voltage of the current to be transmitted, and as illustrated, there are three of said blocks which are preferably made of carbon. Said blocks are somewhat smaller in diameter than the interior diameter of the insulation tube 21, so as to be capable of limited movement endwise of the barrel and to allow for expansion of the blocks in case they become heated.

In the bottom of the barrel is located a metal ring 23 upon which rests a thicker insulation ring 24. A metal plate 25 rests upon top of the insulation ring 24 and is held down thereon by means of an annular shoulder $21^a$ on the inner surface of the insulation tube 21. The bottommost block 22 of the resistance-conductance member 20 rests on the metal conducting plate 25.

The plate 25 and the ring 23 provide the two terminals of the device which are connected to the two sections $15^a$, $15^b$ of one line wire 15 of the circuit which is led into the barrel through a sleeve $19^a$ formed on the bottom cap 19.

In the top cap 18 of the barrel is mounted a pressure member 26. As illustrated, this consists of a rotative rod or pin threaded through a sleeve 18ª, projecting upwardly from the top cap and having its bottom end engaged against a metal conducting plate 27 which rests upon the topmost block 22 of the resistance member 20. A crank arm 28 is fixed in any suitable manner to the top projecting end of the pin 26. A coiled expansion spring 29 is preferably placed about the pin 26 and interposed between a part fixed on the pin and the top cap 18 in order to maintain the pin in whatever position it may have been rotated to, notwithstanding the vibration to which the device may be subjected.

Manifestly, a rotation of the crank arm 28 in one direction will bring pressure to bear upon the stack of blocks comprising the resistance - conductance member, so as to cause their adjacent faces to be brought into closer and more intimate contact throughout the area of their engaging faces. A rotation of the crank arm in the opposite direction will gradually relieve the pressure in proportion as the arm is rotated and will reduce the closeness and intimacy of the contactual engagement of the blocks of the stack. As the blocks 22 of the stack are made of conducting material,—namely carbon, they will provide a good conductor when they are under pressure, such as to bring their adjacent faces into intimate contact. The efficiency of the stack of blocks, however, as a conductor will diminish substantially in proportion as this pressure is relieved, and will finally be brought to such a point that the stack will act as a resistance to completely obstruct the passage of a low voltage current of the kind used with the lamps of vehicles,—and this without arcing between the adjacent blocks of the stack.

In the modified form of the device shown in Fig. 4, all of the parts are constructed as before, but the blocks of the stack, in this case indicated by the reference numeral 22ª, have recesses 22ᵇ in their proximate ends and coiled expansion springs 30 are interposed between the blocks with their ends seated in said recesses. The said springs act to prevent chattering of the blocks (when in positions short of rigid contactual engagement), which might otherwise tend to occur on account of the vibration of the device resulting from running the motor of the vehicle, and from the jar of the vehicle when going over rough roads. Thus flickering of the lights, when the device has been adjusted to dim them, is obviated.

While in describing my invention, I have referred to certain details of mechanical construction and arrangement, it is to be understood that the invention is not limited thereby except as may be pointed out in the appended claims.

I claim as my invention:

1. A variable resistance device of the kind described, comprising a casing, a resistance - conductance device contained in said casing and comprising a plurality of conducting blocks arranged in a stack, means for insulating said resistance-conductance device from said casing, a pressure rod mounted in said casing and engaged with one end of said stack, means for adjusting said rod to vary the pressure on said stack, and means for maintaining said rod in its adjusted position.

2. A variable resistance device of the kind described, comprising a casing, a resistance-conductance device contained in said casing and comprising a plurality of conducting blocks arranged in a stack, means for insulating said resistance - conductance device from said casing, a screw pressure rod rotatively mounted in said casing and engaged with one end of said stack, a crank arm fixed to said rod, and means for maintaining the said rod in any adjusted position.

3. A variable resistance device of the kind described, comprising a casing consisting of a tubular body and top and bottom end caps, an insulation tube within said casing, a plurality of separate carbon blocks arranged in a stack within said casing, means for supporting said stack above said bottom cap and for insulating the bottom end of said stack from said casing, said blocks being of smaller diameter than the internal diameter of said insulation tube, a screw pressure rod threaded through the top cap and arranged to impart pressure to the top end of said stack, and a crank arm fixed to said screw pressure rod and adapted to rotate the same.

4. A variable resistance device, adapted to be interposed in an electric circuit supplying a translating device, comprising a plurality of conducting blocks of comparatively large cross-sectional area in proportion to the voltage of the current in the circuit, said blocks being arranged in a stack forming part of said electric circuit, a pressure device for varying the intimacy and closeness of the contact between adjacent blocks of the said stack, and means for preventing chattering of said blocks when the pressure on the stack is reduced.

5. A variable resistance device, adapted to be interposed in an electric circuit supplying a translating device, comprising a plurality of conducting blocks of comparatively large cross-sectional area in proportion to the voltage of the current in the circuit, said blocks being arranged in a stack forming part of said electric circuit, a pressure device for varying the intimacy and closeness of the contact between adjacent blocks of the said stack, the several blocks being provided with recesses in their proximate ends, and expansion springs interposed between said blocks and seated in said recesses.

In testimony, that I claim the foregoing as my invention I affix my signature in the presence of two witnesses, this 6th day of November A. D. 1916.

ROY E. REED.

Witnesses:
T. H. ALFREDS,
KARL W. DOLL.